(12) United States Patent
Jumppanen et al.

(10) Patent No.: US 7,128,833 B2
(45) Date of Patent: Oct. 31, 2006

(54) CHROMATOGRAPHIC SEPARATION

(75) Inventors: Juho Jumppanen, Surrey (GB); Jarmo Kuisma, Lohja (FI); Hannu Paananen, Kantvik (FI); Vili Ravanko, Clinton, IA (US); Jukka Rinne, Kirkkonummi (FI)

(73) Assignee: Finnfeeds Finland Oy, Espoo (FI)

( * ) Notice: Subject to any disclaimer, the term of this patent is extended or adjusted under 35 U.S.C. 154(b) by 0 days.

(21) Appl. No.: 10/373,505

(22) Filed: Feb. 25, 2003

(65) Prior Publication Data

US 2003/0213749 A1 Nov. 20, 2003

(30) Foreign Application Priority Data

May 17, 2002 (FI) ................................. 20020936

(51) Int. Cl.
*B01D 15/08* (2006.01)

(52) U.S. Cl. ..................................... 210/198.2; 210/659
(58) Field of Classification Search ............. 210/198.2, 210/635, 656, 659; 127/46.2
See application file for complete search history.

(56) References Cited

U.S. PATENT DOCUMENTS

| 2,985,589 | A | 5/1961 | Broughton et al. |
| 4,267,054 | A | 5/1981 | Yoritomi et al. |
| 4,332,623 | A | 6/1982 | Ando et al. |
| 4,970,002 | A | 11/1990 | Ando et al. |
| 5,127,957 | A | 7/1992 | Heikkila et al. |
| 5,198,120 | A | 3/1993 | Masuda et al. |
| 5,637,225 | A | 6/1997 | Heikkila et al. |
| 5,795,398 | A | 8/1998 | Hyoky et al. |
| 6,093,326 | A | 7/2000 | Heikkila et al. |
| 6,187,204 | B1 * | 2/2001 | Heikkild et al. ............ 210/659 |
| 6,224,683 | B1 | 5/2001 | Tanikawa et al. |
| 6,224,776 | B1 | 5/2001 | Heikkil et al. |
| 6,379,554 | B1 | 4/2002 | Kearney et al. |
| 6,409,922 | B1 * | 6/2002 | Kaneko et al. ............. 210/659 |
| 6,663,780 | B1 * | 12/2003 | Heikkila et al. ............ 210/659 |
| 2001/0001956 | A1 | 5/2001 | Hyoky et al. |
| 2002/0011445 | A1 | 1/2002 | Lehoucq et al. |
| 2003/0213749 | A1 * | 11/2003 | Jumppanen et al. ........ 210/656 |

FOREIGN PATENT DOCUMENTS

| FI | 96225 | 2/1996 |
| WO | WO99/34021 | 7/1999 |
| WO | WO 01/54790 A1 | 8/2001 |

OTHER PUBLICATIONS

Giacobello S.., et al., "Design of a Simulated Moving Bed Unit For Sucrose-Betaine Separations"; Journal of Chromatography A. 2000. vol. 872, p. 23-35.

(Continued)

*Primary Examiner*—Ernest G. Therkorn
(74) *Attorney, Agent, or Firm*—Scully, Scott, Murphy & Presser, P.C.

(57) ABSTRACT

The invention relates to an equipment for fractionating a solution by a sequential SMB process, which equipment comprises a feed column and one or several other columns, which include a chromatographic separation resin bed. The equipment of the invention is characterized in that the feed column consists of or comprises a compartment where the resin bed is shallower than that of one or more of the other columns of the equipment. The invention also relates to a method for fractionating a solution into two or more fractions with the equipment of the invention.

13 Claims, 4 Drawing Sheets

OTHER PUBLICATIONS

Jupke A., "Optimal Design of Batch and Simulated Moving Bed Chromatographic Separation Processes"; Journal of Chromatography A. 2002. vol. 944. p. 93-117.

Vadim Kochergin, et al., "Fractal Structures For Uniform Fluid Distribution in the Sugar Industry", *Zuckerindustrie*, 126, Nr. 1, pp. 51-54; (2001).

* cited by examiner

CHROMATOGRAPHIC SEPARATION

FIELD OF THE INVENTION

The present invention relates to chromatographic simulated moving bed equipments and methods for fractionating solutions using chromatographic simulated moving bed processes. More specifically, the present invention relates to a sequential chromatographic simulated moving bed equipment and a method for fractionating solutions using a shallow resin bed compartment as a feed column. The equipment and the method of the invention can be applied to the fractionation of solutions like molasse solutions, vinasse solutions and sulphite cooking liquors, for example.

BACKGROUND OF THE INVENTION

Continuously operated chromatographic separation processes commonly employ a simulated moving bed method (SMB method), which is used in a variety of different applications. The SMB method may be continuous or sequential or comprise a combination of a continuous method and a sequential method. In the continuous SMB process, all fluid streams typically flow continuously. In the sequential SMB process, some of the fluid streams do not flow continuously. The sequential SMB process commonly comprises three basic phases: a feeding phase, an elution phase and a circulation phase. During the feeding phase, a feed solution and possibly also an eluant during a simultaneous eluting phase, is introduced into a predetermined column containing one or more partial packed beds, and simultaneously a product fraction or fractions are withdrawn. During the eluting phase, the eluant is introduced into a predetermined partial packed bed or predetermined partial packed beds, and during these phases two, three or even four product fractions are withdrawn. During the circulation phase all columns are connected into a loop, whereby no feed solution or eluant is supplied to the partial packed beds and no product fractions are withdrawn. However, circulation as such takes place during all three phases.

The continuous SMB process has been described, for example, in U.S. Pat. No. 2,985,589 (Universal Oil Prod. Co). In this process the mixture to be fractionated is introduced into one partial packed bed and an eluant is introduced into another partial packed bed, and two product fractions are withdrawn substantially simultaneously. U.S. Pat. No. 5,198,120 (Organo KK) describes a continuous SMB process in which the feed point is fixed. The feed is introduced sequentially once a cycle and simultaneously with the introduction of the feed a first extract fraction and raffinate are taken out from the system. The examples of this patent use a simulated moving bed consisting of eight packed columns linked with each other in series, and each column, including the feed column, having an equal packed bed height.

Sequential SMB processes are described in U.S. Pat. Nos. 4,332,623 (Mitsubishi Chem. Ind.), 4,379,751 (Samnatsu Kogyo) and 4,970,002 (Mitsubishi Kasei Tech. Eng.), for instance. FIG. 1 of the above-mentioned U.S. Pat. No. 4,332,623 (Mitsubishi Chem. Ind.) discloses an apparatus for carrying out said method, which apparatus has three unit packed beds, which may be of the same or different size. Furthermore, the above-mentioned U.S. Pat. No. 4,970,002 (Mitsubishi Kasei Tech. Ing.) discloses a chromatographic separation apparatus including two packed beds, which may be the same or different in terms of bed capacity or the volume of the packing material.

A sequential SMB process for the recovery of betaine and sucrose from beet molasses is described in U.S. Pat. No. 5,127,957 (Heikkilä, H. et al.). To increase the separation capacity, yields and fraction purities and fraction dry substance concentrations, SMB modes including two or more loops or two or more separation profiles have been developed. In U.S. Pat. Nos. 6,093,326 (Danisco Finland Oy) and 5,637,225 (Xyrofin Oy) SMB processes including multiple loops are described. U.S. Pat. No. 6,224,776 (Cultor Corp.) discloses a method for fractionating a solution into two or more fractions in a SMB process where the separation system comprises at least two separation profiles in the same loop.

WO 01/54790 (Amalgamated Res. Inc.) describes a column apparatus for a fluid processing system containing a shallow bed of material between fluid transporting fractals of large active surface area. In said apparatus, said shallow bed of material has been provided as a column having greater diameter than height.

However, it does not appear from any of the above-mentioned references that the design of the feed column would differ significantly from that of the other columns used in the process.

One problem associated with the above SMB process modes is the so-called viscous fingering phenomenon which in turn causes the tailing effect of the chromatograms. Another problem with these SMB processes is the random resin movement which, as being irregular and turbulent, blends the frontiers and decreases the separation capacity.

It has now been found in accordance with the present invention that by using a shallow resin bed compartment as the feed column the problems above can be overcome or alleviated. With the use of a shallow resin bed compartment as the feed column, the viscous fingering and the random resin movement can be reduced. This leads to an improved separation profile in the feed column, which permits improved performance of the later columns.

DEFINITIONS RELATED TO THE INVENTION

In the present invention, a column refers to a section of the chromatographic equipment which holds a chromatographic separation resin bed and which comprises a forepart for feeding eluant and/or feed solution and a rear part for withdrawing product fractions. A feed column refers to a section of the chromatographic equipment which holds a chromatographic separation resin bed and which comprises a forepart for feeding a feed solution and a rear part for withdrawing product fractions. A column may be composed of one or several compartments. A compartment refers to a section of a column (which contains a part for feeding eluant and/or feed solution, or a part for withdrawing product fractions or both).

DESCRIPTION OF THE INVENTION

Figure 1:
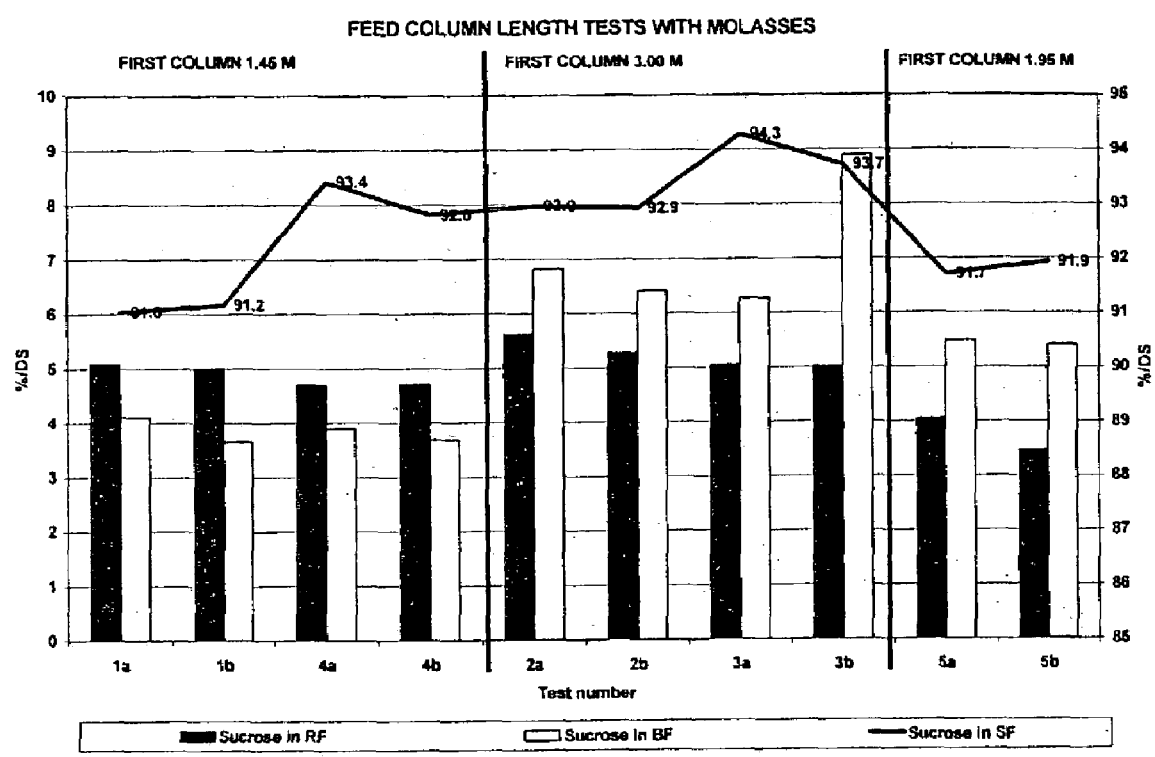
FIG. 1 shows how sucrose is divided into the residual, sucrose and betaine fractions (RF, SF and BF fractions) in the fractionation of a molasse solution using different feed column lengths, i.e. where the first column is 1.45 m, 3.00 m or 1.95 m, respectively.

The present invention relates to a sequential SMB equipment having a shallow resin bed compartment as a feed column. Furthermore, the present invention relates to a method for fractionating a solution by a sequential chromatographic SMB process in which a shallow resin bed compartment as a feed column is used. A shallow resin bed compartment used as a feed column improves the performance figures of the sequential SMB equipment and separation process essentially. The so-called viscous fingering phenomenon is substantially minimized and the tailing effect of the chromatograms is then correspondingly decreased. The tailing effect of the chromatograms is a real problem with industrial chromatographic applications where the linear flows and loads of dry substances are heavy. In addition, the shallow resin bed compartment design minimizes resin movement. The resin movement in a column is random and as being irregular and turbulent, blends the frontiers and decreases the separation results of an SMB process.

The invention relates to an equipment for fractionating a solution by a sequential chromatographic SMB process, comprising a feed column and one or several other columns connected in series, said feed column and said other columns including a chromatographic separation resin bed. The invention is characterized in that the feed column consists of or comprises a compartment where the resin bed is shallower than that of one or more of the other columns of the equipment.

In the following description and the claims, the above-mentioned expression "a compartment where the resin bed is shallower than that of one or more of the other columns of the equipment" is also referred to as "a shallow resin bed compartment". In connection with the present invention, the shallow resin bed compartment refers to a column compartment including a resin bed which is shallower than the resin bed of one or more of the other columns of the equipment.

In one embodiment of the invention, the shallow resin bed compartment is the sole compartment of the feed column. In this embodiment of the invention, the feed column is composed of one compartment only, including a resin bed which is shallower than that of one or more of the other columns of the equipment. In one embodiment of the invention, the resin bed of the feed column is shallower than that of the next column of the equipment. The resin bed of the feed column may also be shallower than the resin bed of any of the other columns of the equipment. As a typical example, the equipment may consist of a short feed column with a shallow resin bed and one or more other columns with a higher resin bed. In one embodiment of the invention, said one or more other columns have an equal height. In the latter embodiment of the invention, said shallow resin bed compartment of the feed column is shorter than the resin bed of any of the other columns of the equipment.

In another embodiment of the invention, the feed column comprises one, two or several shallow resin bed compartments. In this embodiment of the invention, the feed column is divided into two or more compartments, which form said shallow resin bed compartments. In a preferred embodiment of the invention, the first of said shallow resin bed compartments is shorter than the others. As a typical example, the feed column may be divided into two compartments, the resin bed of the first compartment being shorter than that of the second compartment. The feed column may also be divided into two compartments with an equal height. It is also possible to divide the feed column into more than two compartments, whereby the resin bed of the first compartment is preferably shorter than the resin bed of the others.

In a preferred embodiment of the invention, the feed column comprises one or two shallow resin bed compartments. In the case of two shallow resin bed compartments, the resin bed of the first shallow resin bed compartment is preferably shallower than the resin bed of the second shallow resin bed compartment.

The height of the resin bed of the shallow resin bed compartment is typically equal to or less than 16.7% of the total height of the resin beds of the columns of the equipment. In a preferred embodiment of the invention, the height of the shallow resin bed compartment is typically equal to or less than 15% of the total height of the resin beds of the columns of the equipment. In another preferred embodiment of the invention, the height of the shallow resin bed compartment is equal to or less than 12.5% of the total height of the resin beds of the columns of the equipment. In a still more preferred embodiment of the invention, the height of the shallow resin bed compartment is equal to or less than 10% of the total height of the resin beds of the columns of the equipment.

The height of the chromatographic separation resin bed of said feed column, said shallow resin bed compartment thereof and said other columns preferably corresponds to the height of said column or said compartment. However, the height/volume of the resin bed of the columns of the equipment may even be less than the height/volume of the columns.

An economic way of carrying out the present invention in the SMB systems already existing is to divide the existing feed column into two or more compartments of equal or different height. Accordingly, in this embodiment of the invention, the equipment of the present invention may contain two or more shallow resin bed compartments as a feed column. The first compartment of the feed column is preferably shorter than the others. In practice, the division of the feed column into two or more compartments may be carried out by installing an extra plate or plates with a collecting device for the solution to be fractionated. A perforated plate that permeates the solution to be fractionated may also be used.

Chromatographic separation resins are used as a column packing material. The resins are typically ion exchange resins, especially cation or anion exchange resins. The resin is selected depending on the raw material mixture and/or the products to be recovered. The resins and their properties are well known to those skilled in the art.

Said one or several other columns of the equipment typically comprise up to 10 columns, preferably 2 to 5 other columns. In one preferred embodiment of the invention, a combination of a feed column and 2 to 5 other columns is used, whereby the feed column and said other columns have an equal height. The feed column has been divided into two compartments so that the first compartment of the feed column is shorter than the second compartment.

In addition to the feed column including at least one shallow resin bed compartment and one or several other columns connected in series, the chromatographic equipment employed in the present invention typically comprises fluid conduits connecting the columns, solution and eluant containers, feed and eluant conduits, recycle and feed pumps, heat exchangers, product fraction withdrawal conduits and valves, flow and pressure regulators, and on-line concentration, density, optical activity and conductivity meters.

The present invention also relates to a method for fractionating a solution into two or more fractions by a sequential chromatographic SMB process with an equipment comprising a feed column and one or several other columns connected in series, said feed column and said other columns including a chromatographic separation resin bed, wherein said fractions are recovered during a multi-step sequence comprising a feeding phase, an eluting phase and a circulation phase. The method of the invention is characterized in that said feeding phase is carried out on a feed column consisting of or comprising a compartment where the resin bed is shallower than that of one or more of the other columns of the equipment.

Preferred embodiments of the method of the invention are the same as described above for the equipment of the invention.

The sequential SMB method used in the present invention typically comprises three basic phases: a feeding phase, an elution phase and a circulation phase. The method is carried out using an equipment comprising a feed column and one or more other columns, which include a chromatographic separation resin bed. During the feeding phase, a feed solution and possibly also an eluant during a simultaneous eluting phase, is introduced into the feed column consisting of or comprising a compartment where the resin bed is shallower than that of one or more of the other columns of the equipment, and simultaneously a product fraction or fractions are withdrawn. During the eluting phase, the eluant is introduced into a predetermined column or predetermined columns, and during these phases two, three or even four product fractions are withdrawn. During the circulation phase all columns are connected into a loop, whereby no feed solution or eluant is supplied to the columns and no products are withdrawn. However, the circulation as such takes place during all three phases.

In one embodiment of the invention, the sequential SMB process of the invention typically comprises the following phases:

a) a feeding phase, wherein the feed solution is fed into the feed column and optionally simultaneously eluant is fed into a subsequent column, and during the feeding phase at least one product fraction and/or one other fraction other than the product is collected from the same or subsequent column, b) a circulation phase, wherein all the columns of the equipment are connected into a loop and nothing is fed into or collected from the system, c) an eluting phase, wherein the eluant is fed into one of the columns and a residual fraction (a by-product fraction including mainly organic and/or inorganic salts, non-sugars, colour molecules with a high molecular mass and some oligosaccharides) and optionally a second product fraction or fractions is/are collected from the same or from the subsequent columns, phases a) to c) are used during one cycle one to several times.

The present invention is well suitable for separating substances that are difficult to separate from mixtures containing them. Such mixtures include molasses, vinasses, beet-derived juices, starch, wood and/or bagasse hydrolysates, invert sugar mixtures, sulphite cooking liquors, milk whey solutions and other lactose-containing solutions, lactulose-, maltose-, and/or maltitol-containing solutions, fructose/glucose syrups and the like. Preferably the solution to be fractionated is a molasse solution, a vinasse solution or a sulphite cooking liquor. The molasse solution preferably comprises beet and/or cane molasses. In the present invention sulphite cooking liquor refers to a liquor employed in the cooking of sulphite cellulose or a part thereof, a liquor ensuing from the cooking or a part thereof, a liquor used in the sulphite cooking or a part thereof or a liquor removed from the sulphite cooking liquor during the cooking or a part thereof. In general, the biggest gain of the present invention is achieved in separations where the salt concentration in the feeding phase is high, i.e. in separations where the raw material contains salts in considerable amounts, such as beet molasses, vinasse and sulphite cooking liquor mentioned above. The salt content of the raw material may be up to 40% or even up to 65%, based on DS (dry substance content). For instance, the salt content of beet molasses may be up to 30.5% on DS, that of vinasse up to 61.1% on DS and that of sulphite cooking liquor up to 37.2% on DS.

The products that are recovered using the equipment and/or method of the present invention include sucrose, fructose, glucose, betaine, rhamnose, arabinose, mannose, raffinose, lactose, maltose, maltitol, inositol, mannitol, xylitol, xylose, sorbitol, and amino acids.

In one embodiment of the invention, a molasse solution is fractionated into sucrose and betaine.

The eluants employed are well known to those skilled in the art and include water, organic solvents such as alcohols, aqueous salt-containing solutions, or mixtures thereof.

The flow rate may depend on the raw material mixture, the products to be recovered, the resin employed and/or other specific process parameters, such as the number of separation profiles and cycles.

As described above, the equipment and/or method of the present invention improve the SMB separation capacity. The improved capacity is achieved by using a shallow resin bed compartment as a feed column.

The present invention will be further clarified by the following example which is intended to be purely exemplary of the invention.

EXAMPLE

The purpose of this study was to show how the length of the feed column affects the separation profile in a batch mode SMB process. Further, the optimum feed column configuration in molasses separation was studied.

In this example, the term "fraction sample" refers to a representing sample of a product fraction, taken from the separation process during the fractionation of the product fraction. In a molasses separation process, such product fractions include sucrose fraction, raffinate fraction and betaine frcation, for example. These fraction samples are then analyzed in regard to components which are separated into each fraction.

The term "profile sample" refers to one spot sample collected during a few seconds from the separation profile. Several profile samples, for example 20 to 40 samples are collected per separation profile. The profile samples are collected at regular time intervals (for instance with the intervals of 2 to 4 minutes), until the whole profile has passed the point where the samples are collected. The profile samples are then analyzed in the same way as the fraction samples.

Tests were carried out with an SMB-equipment having a column diameter of 0.2 m and a total bed length of 18.45 meters. The total length of the first two columns was 4.45 m.

Separation resin (Lewatit) having a bead size of 0.37 mm was used as the separation resin. The resin was backwashed before the molasses tests. The first two columns were packed without NaCl-solution so that there was some room for resin expansion and shrinking. The last five columns were packed with 8% NaCl-solution.

Molasses used was beet molasses. It was pretreated as follows: carbonation with 1.5–1.8%/DS $Na_2CO_3$, pH-adjustment with 50% NaOH (pH about 9.5–9.7), Seitz-filtration (Kenite 300 as a precoat in an amount of 1 kg/m² and bodyfeed about 0.5%/DS) and the final pH-adjustment with HCl (approx. 0.2 units down). Molasses was finally diluted to a dry substance content of 55 g/100 g with ion-exchanged water. Table 1 shows the analyses of feed molasses used in test 1a.

TABLE 1

Feed analyses in test 1a

Beet molasses after pretreatment

| | |
|---|---|
| Dry substance content of feed, g/100 g | 55.4 |
| PH | 9.68 |
| Conductivity, mS/cm | 13.3 |
| Sucrose, %/DS | 59.2 |
| Betaine, %/DS | 6.8 |
| Others, % DS | 34.0 |

The lengths of the two first columns were varied to have different lengths in them. Altogether three different feed column configurations were tested. Table 2 shows the column configurations used in the different tests. The flow rate in every test was kept constant (100 l/h).

TABLE 2

Feed column configurations in different tests

| Test numbers | Col. 1 (m) | Col. 2 (m) | Col. 3 (m) | Col. 4 (m) | Col. 5 (m) | Col. 6 (m) | Col. 7 (m) |
|---|---|---|---|---|---|---|---|
| 1a + 1b + 1c + 1d | 1.45 | 3.00 | 3.00 | 2.50 | 3.00 | 2.50 | 3.00 |
| 4a + 4b | 1.45 | 3.00 | | | | | |
| 2a + 2b + 2c + 2d | 3.00 | 1.45 | | | | | |
| 3a + 3b + 3c + 3d | 3.00 | 1.45 | | | | | |
| 5a + 5b + 5c + 5d | 1.95 | 2.50 | | | | | |
| 6a + 6b | 1.95 | 2.50 | | | | | | a/b = fraction samples/on-line data from two following feeds, c = profile samples from column 2, d = profile samples from column 7

The resin was balanced with several feed pulses before testing. Tests were carried out so that the first fraction samples (e.g. 1a) were collected from the third out coming feed and the second samples (e.g. 1b) from the fourth feed when the fifth feed was still going in to the feed column (to have a best possible situation without any disturbance due to resin movings etc. and also to simulate the situation in the resin bed when a 2-profile SMB-sequence would have run). Every column configuration was tested twice to minimize possible errors caused by process instruments like flow meters etc. From tests 6a and 6b no fraction samples were collected. The profile samples from partial columns 2 and 7 were collected next day (e.g. 1c/1d). The process data (on-line instruments like conductivity from partial columns ½, 3, 5 and 7, concentration from column 7) were collected from every test. The on-line data seemed to give the best information of separation behaviour and that is why some fraction samples and profile samples were not collected from the latest tests.

A total of three different feed column configurations were tested as seen in table 2. In the first configuration the height of the feed column was 1.45 m, in the second configuration it was 3.00 m and in the third configuration 1.95 m. All the tests were carried out with the same sequence program to have exactly the same fraction limits to get an idea how different compounds are divided in different fractions. The on-line profiles of tests 2 ("long"), 4 ("short") and 5 ("mid") from the last column are also presented in FIGS. 2a and 2b.

As seen in FIG. 1 the sucrose content in the betaine fraction is increasing (the sucrose peak is tailing more) when the feed column is longer. The difference in the residual fractions is much smaller.

Figure 2A:
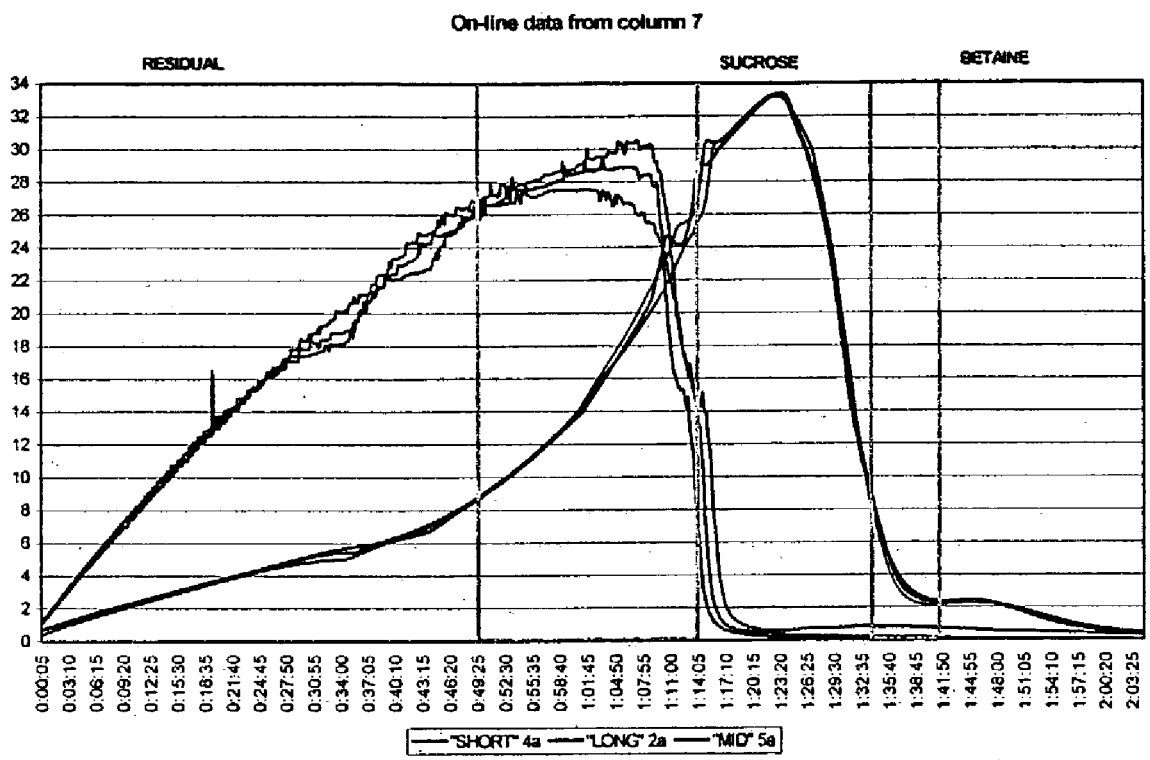
FIG. 2a shows the on-line concentration and conductivity profiles after the last column with different feed column lengths (first column was 1.45 m in test 4a, 3.00 m in test 2a and 1.95 m in test 5a).
Figure 2B:
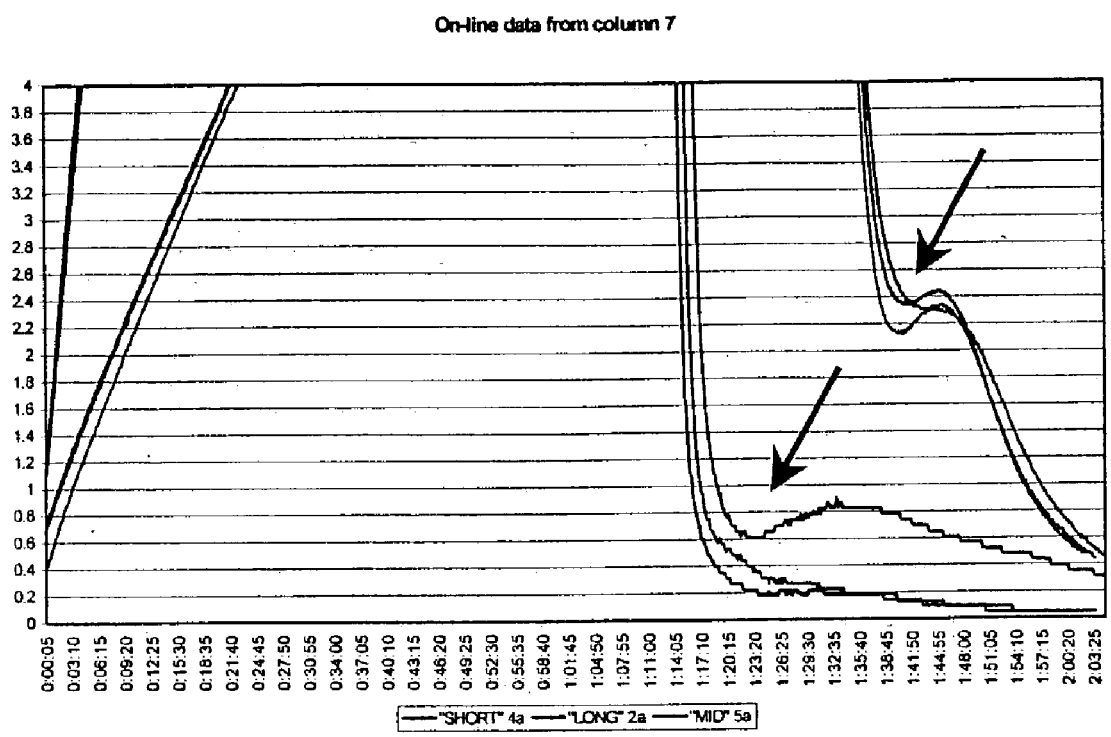
FIG. 2b is a zoomed part of FIG. 2a to show better the detected concentration differences between sucrose and betaine peaks and also the difference in tailing parts of conductivities.
Figure 3:
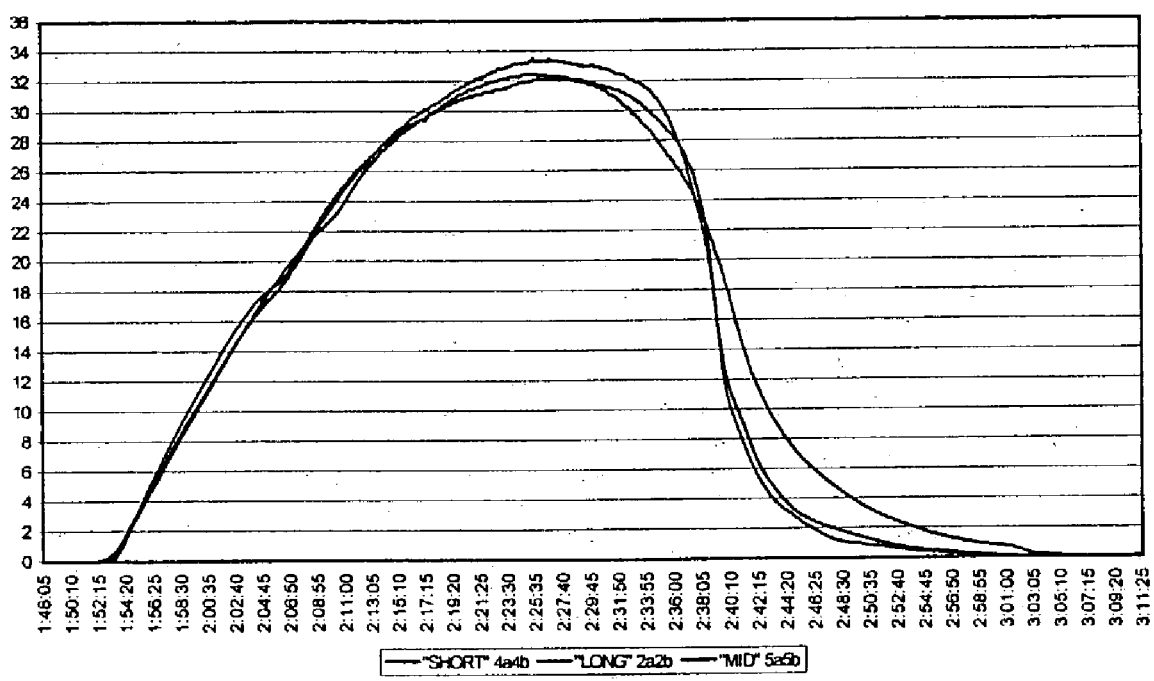
FIG. 3 shows the conductivities after column 3.

As seen in FIGS. 2a, 2b and 3 the conductivity profile is tailing more when the first column is longer and also the conductivity peak is smoother. The separation between sucrose and betaine is better with a shorter feed column as seen in FIG. 2b. The difference between the 1.45 m and 1.95 m columns is small, but according to FIGS. 1 and 2b betaine is separating slightly better when the height of the first column is 1.45 m.

These results show that a short feed column (or a feed column divided into two compartments instead of one longer column) gives benefit for separation performance.

It will be obvious to a person skilled in the art that, as the technology advances, the inventive concept can be implemented in various ways. The invention and its embodiments are not limited to the examples described above but may vary within the scope of the claims.

The invention claimed is:

1. An equipment for fractionating a solution by a sequential chromatographic SMB process, having a reduced tailing effect comprising a feed column and one or several other columns connected in series, said feed column and said other columns including a chromatographic separation resin bed, characterized in that the feed column consists of at least one shallow resin bed compartment where the resin bed is shallower than that of any other columns of the equipment, and wherein the height of the resin bed of said at least one shallow resin bed compartment is equal to or less than 12.5% of the total height of the resin beds of the columns of the equipment.

2. An equipment according to claim 1, characterized in that said shallow resin bed compartment is the sole compartment of the feed column.

3. An equipment according to claim 1, characterized in that the feed column comprises selectively one, two or several shallow resin bed compartments.

4. An equipment according to claim 3, characterized in that the resin bed of a first one of said shallow resin bed compartments is shallower than the resin beds of the other compartments.

5. An equipment according to claim 1, characterized in that the resin bed of said shallow resin bed compartment of the feed column is shallower than that of the next column of the equipment.

6. An equipment according to claim 1, characterized in that the height of the resin bed of said at least one shallow resin bed compartment is equal to or less than 10% of the total height of the resin beds of the columns of the equipment.

7. An equipment according to claim 1, characterized in that said shallow resin bed compartment is formed by dividing the feed column into first and second compartments, wherein the resin bed of the first said compartment is shallower than the resin bed of the second said compartment.

8. An equipment according to claim 1, characterized in that said shallow resin bed compartment is formed by dividing the feed column into first, second and third compartments, wherein the resin bed of the first said compartment is shallower than the resin beds of the second and third said compartments.

9. An equipment according to claim 1, characterized in that the height of the resin bed of said shallow resin bed compartment is equal to or less than 1.95 meters.

10. An equipment according to claim 1, characterized in that the height of the resin bed of said shallow resin bed compartment is between 1.45 meters and 1.95 meters.

11. An equipment according to claim 1, wherein the total number of columns is up to 10.

12. An equipment according to claim 1, wherein the shallow resin bed compartment contains a part for feeding feed solution and/or eluant.

13. An equipment according to claim 1, wherein the shallow resin bed compartment contains a part for feeding feed solution and/or eluant and a part for withdrawing product fractions.

* * * * *